(12) United States Patent
Cvorovic et al.

(10) Patent No.: US 8,369,055 B2
(45) Date of Patent: Feb. 5, 2013

(54) METHOD FOR SETTING FREE DETECTION OF OUT OF STEP CONDITION IN ELECTRICAL POWER SYSTEM

(75) Inventors: Branislav Cvorovic, Stafford (GB); Harmeet Kang, Stafford (GB)

(73) Assignee: Areva T&D UK Ltd, Staffordshire (GB)

( * ) Notice: Subject to any disclaimer, the term of this patent is extended or adjusted under 35 U.S.C. 154(b) by 373 days.

(21) Appl. No.: 12/746,915

(22) PCT Filed: Dec. 13, 2007

(86) PCT No.: PCT/EP2007/063906
§ 371 (c)(1),
(2), (4) Date: Aug. 3, 2010

(87) PCT Pub. No.: WO2009/074181
PCT Pub. Date: Jun. 18, 2009

(65) Prior Publication Data
US 2010/0302695 A1    Dec. 2, 2010

(51) Int. Cl.
*H02H 3/00* (2006.01)
*H02H 7/00* (2006.01)
*G01R 31/08* (2006.01)
*G01R 21/06* (2006.01)

(52) U.S. Cl. .............. 361/78; 361/85; 324/521; 702/60; 702/64

(58) Field of Classification Search .................. 361/78, 361/85; 324/521; 702/60, 64
See application file for complete search history.

(56) References Cited

U.S. PATENT DOCUMENTS

| 4,825,323 | A * | 4/1989 | Wilkinson | 361/65 |
| 5,731,943 | A * | 3/1998 | Roberts et al. | 361/80 |
| 6,212,446 | B1 * | 4/2001 | Sato | 700/293 |
| 6,833,711 | B1 * | 12/2004 | Hou et al. | 324/521 |
| 8,200,372 | B2 * | 6/2012 | Joos et al. | 700/292 |
| 2006/0152866 | A1 * | 7/2006 | Benmouyal et al. | 361/42 |
| 2009/0089608 | A1 * | 4/2009 | Guzman-Casillas | 713/340 |

FOREIGN PATENT DOCUMENTS

EP    0783197 A1    7/1997

OTHER PUBLICATIONS

International Search Report, PCT/EP2007/063906, dated Aug. 19, 2008.

* cited by examiner

*Primary Examiner* — Jared Fureman
*Assistant Examiner* — Scott Bauer
(74) *Attorney, Agent, or Firm* — Nixon Peabody LLP

(57) ABSTRACT

A method of determining out of step condition and an instance of separation within electrical power system. The method does not require user settings and ensures reliable discrimination between recoverable power swing and pole slips that indicates non-recoverable power swing and the need for system separation. The method also allows tripping at a user selected system angle if desired. A calculated angle is used to determine the magnitude of the swing current to control the tripping at the desired angle θ when the system could be safely split after detection of out of step condition based on the criteria of this invention.

3 Claims, 3 Drawing Sheets

METHOD FOR SETTING FREE DETECTION OF OUT OF STEP CONDITION IN ELECTRICAL POWER SYSTEM

CROSS REFERENCE TO RELATED APPLICATIONS OR PRIORITY CLAIM

This application is a national phase of International Application No. PCT/EP2007/063906, entitled "METHOD FOR SETTING FREE DETECTION OF OUT OF STEP CONDITION IN ELECTRICAL POWER SYSTEM", which was filed on Dec. 13, 2007.

TECHNICAL DOMAIN

The invention relates to a method of determining out of step condition and a method of determining power system separation at a desired system angle within electrical power system.

STATE OF PRIOR ART

Protection relays are used to detect faults and abnormal conditions on electrical power systems. Out of step condition is one of those abnormal conditions where the Power System has to be split to preserve individual islands healthy. These abnormal conditions can lead to the electrical power system becoming unstable which can cause a voltage collapse or blackout.

In order to allow remedial action to be taken it is first necessary to establish when the electrical power system has become unstable. To this end, out of step protection has traditionally been implemented using impedance blinders to measure the time it takes for the locus of measured impedance to traverse across the two blinders. This method requires a very detailed system study and generally can only detect a condition after passing the blinder on the opposite side. This method also does not give any indication of the system angle changes, hence not aiding in providing the right time (angle) to split the system.

Another known method uses the polarity of the active part of swing impedance in conjunction with rate of change of impedance and polygon characteristics to discriminate between recoverable swing and pole slips.

Yet another known method uses a high rate of change of power for predictive out of step tripping and change of polarity of active component of positive sequence resistance on entering and leaving the polygon characteristics.

Yet another known method, has a technique that uses a starting polygon which has to be set. The algorithm uses a 'space vector estimation' that is based on speed estimation and shape analysis of the impedance trajectories. Under swing conditions the impedance vectors describe an elliptical trajectory. By analyzing this ellipse with its estimated centre, one can also distinguish between stable and unstable swings. Any change in the trajectory shape and swing speed is recognized, enabling up to 7 Hz slip frequency detection.

The disadvantage of such approaches results from the fact that all those methods require comprehensive system studies for the out of step detection method to succeed, require some settings of parameters to be decided upon and set to operate algorithms correctly and yet within the restrictions of those settings. Thus neither of those methods is completely setting free and does not avail splitting the system at the most optimized angle.

Therefore there is a need to more accurately assess when the system is going out of step in order to be able to split the system into islands at the most optimized angle to avoid systems collapse and blackouts and also significantly reducing breaking duties of the circuit breakers during separation.

An object of the invention is a method of determining out of step condition that does not require user settings and which ensures reliable discrimination between recoverable power swing and pole slips that indicates non-recoverable power swing and the need for system separation.

An other object of the invention is a method which also allows tripping at a user selected system angle if desired.

The invention is universal in its application and is not dependant on the level of prevailing load current and the network configuration.

PRESENTATION OF THE INVENTION

The essence of the invention is the fact that the change of polarity of the superimposed positive sequence current ($\Delta I$) is compared with the change in polarity of the positive sequence resistance ($\Delta R$) is consistently specific to stable system condition and specifically different in out of step condition. All measurements are local.

In case of the recoverable power swings the change of $\Delta I$ polarity coincides with the change of $\Delta R$ polarity, whilst during pole slip condition the $\Delta I$ changes sign and $\Delta R$ does not change its polarity.

The method according to the invention comprises the following steps:
measuring the current and the voltage of power system;
calculating the superimposed positive sequence current and superimposed positive sequence resistance;
determining the change in polarity of superimposed positive sequence current ($\Delta I$);
determining change in polarity of superimposed positive sequence resistance ($\Delta R$);
comparing change of polarity of the superimposed positive sequence current ($\Delta I$) with the change in polarity of the positive sequence resistance ($\Delta R$);
determining recoverable swing when the change of $\Delta I$ polarity has changed with the change of $\Delta R$ polarity;
determining pole slip, indicating non-recoverable swing, when the $\Delta I$ polarity has changed whilst $\Delta R$ polarity remains unchanged;
calculating the correct instant for tripping ($I_{tripping}$) that corresponds to the desired angle between the two ends of the unstable power system based on pole slip detection.

The invention allows setting free out of step detection and system split at the favourable angle to safeguard primary equipment.

According to another aspect of the invention, the magnitude of the swing current to control the tripping at the desired angle θ is determined from the formula:

$$I_{tripping} = I\max \sin(\theta/2),$$

Where:
θ—the desired system split angle selected between 240° and 270°,
$I_{max}$=maximum recorded swing current.

BRIEF DESCRIPTION OF THE FIGURE

Other features and advantages of the invention will appear from the following description taken as a non limiting example with reference to the following drawings in witch.

Figure 2:
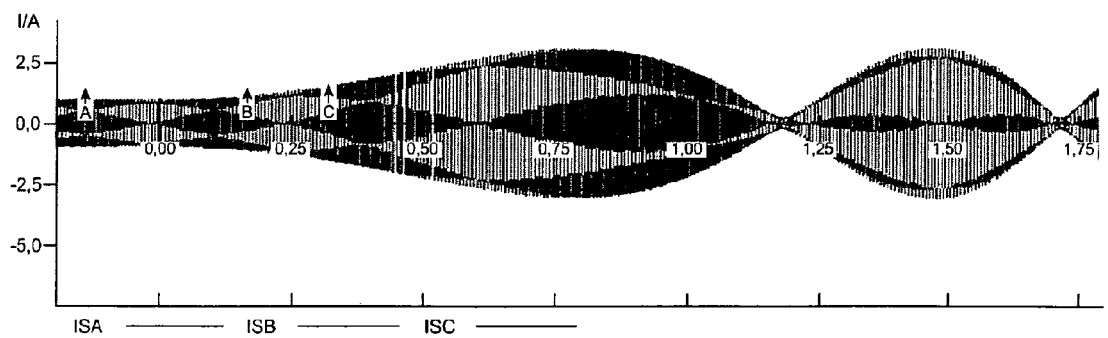
Figure 3:
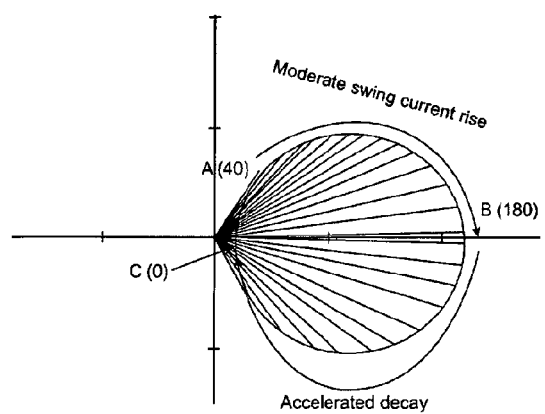
Figure 4:
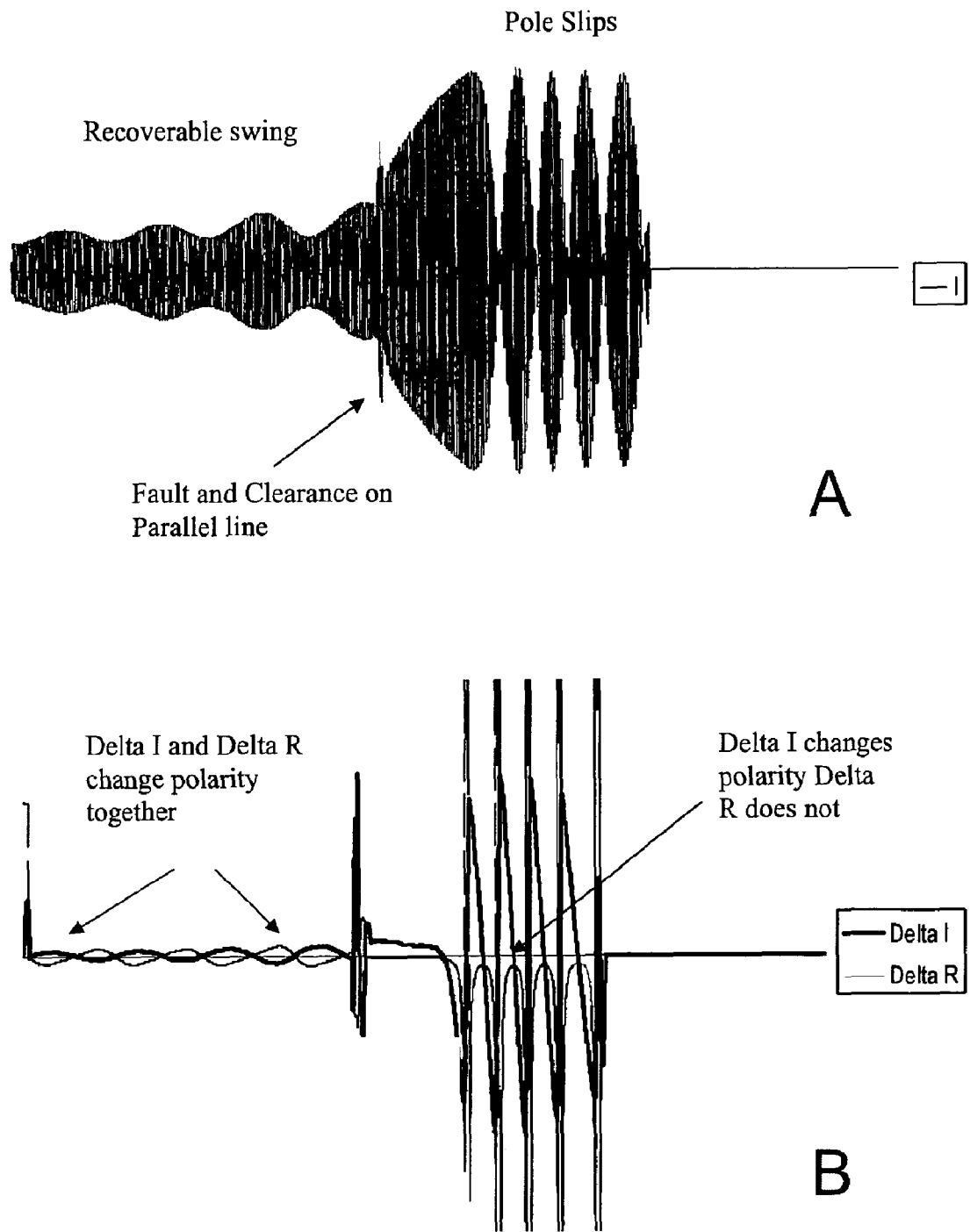
Figure 5:
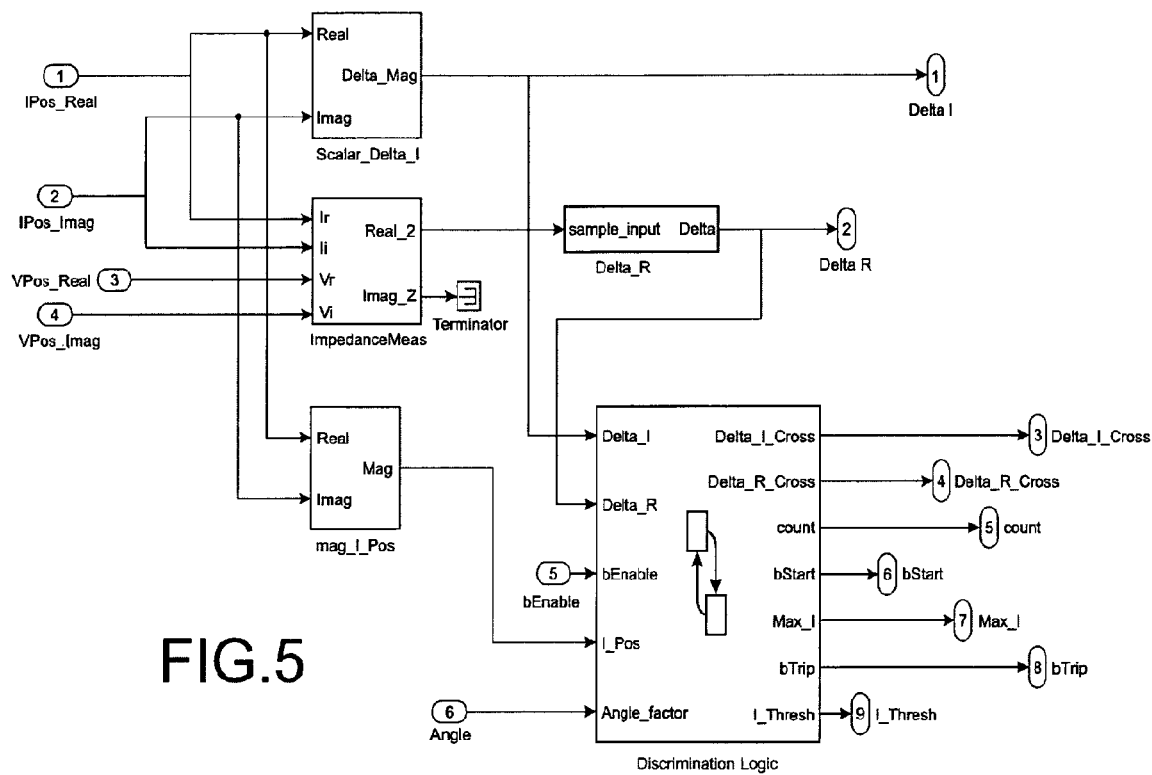

Vs Time(x-axis)) in an impedance plane (R[resistance] on x-axis and X[reactance] on the y-axis);

FIG. 2 show swing current vs time with three Markers A, B and C) where A represents the current before the swing starts B represents the point when swing current reaches maximum value and C represents swing current minimum;

FIG. 3 depicts the swing current magnitude (shown in FIG. 2) plotted against the angle difference between the internal voltages at the two ends of a swinging system over the duration of a swing cycle. X-axis represents the angle and Y-axis the current magnitude;

FIG. 4 represents a current vs time plot of a system initially swing in a recoverable mode (left half of the figure) and then swinging in non recoverable mode after fault clearance on a parallel line, and Superimposed on that plot are Delta I (positive sequence) and Delta R (positive sequence), also vs Time;

FIG. 5 shows measurement and discrimination logic of the invention.

DESCRIPTION OF A DETAILED EMBODIMENT OF THE INVENTION

Figure 1:
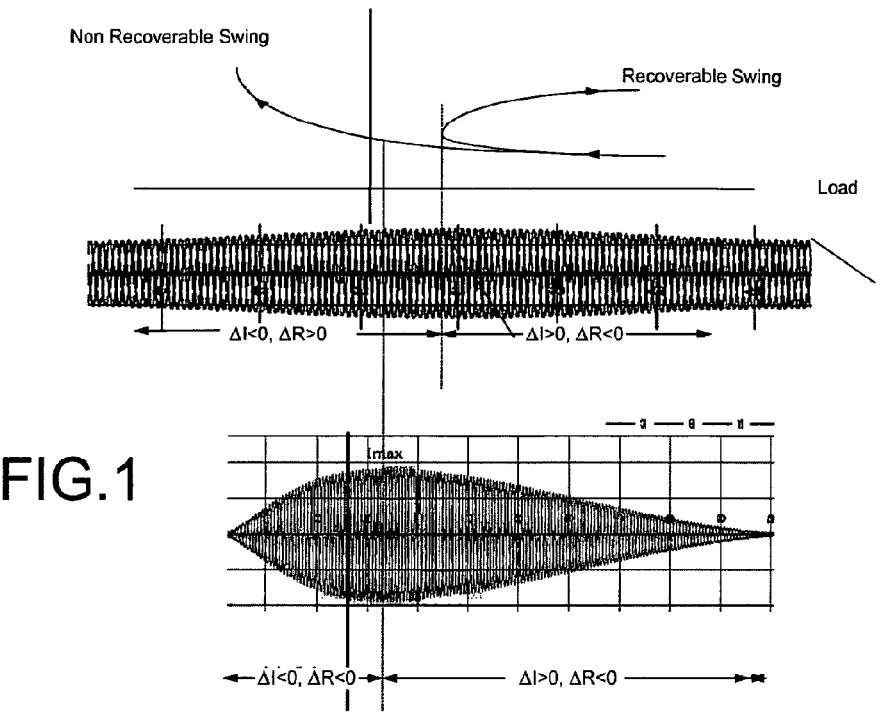
FIG. 1 is a representation of the trajectory of the impedance locus of the bottom two waveforms (Swing Current (y-axis)

From FIG. 1, it can be seen that as the swing progresses, the positive sign of ΔI coincides with negative sign of ΔR and vice versa. After the swing current reaches it's peak (labelled as P on FIG. 1), ΔI polarity will switch from positive to negative regardless of the nature of the swing. At that point the ΔR polarity is checked.

Referring to FIG. 1, reference 1 represents the point where ΔR would be at the start of the swing. If ΔR switches polarity from negative to positive, it is a recoverable swing illustrated by arrow 2 representing ΔR locus for a recoverable swing. If however the ΔR polarity remains negative, it is a non-recoverable swing illustrated by arrow 3 representing ΔR locus for a non recoverable swing.

As shown at FIG. 1 the swing current trajectory for recoverable swing is generally symmetrical (the duration of rising part equals the decaying part). After the swing peak current is reached the change in polarity of ΔI and ΔR will not be coincidental. The non-recoverable swing trajectory in FIG. 1 represents a typical pole slip condition. The maximum swing current is recorded at the point when ΔI changes polarity and is used as an indication of the maximum phase shift between two equivalent sources. At the point of time when the pole slip condition has been detected the phase shift between two sources equals 180 degrees. This peak magnitude is stored and used to calculate mathematically the exact angle between two sources. This calculated angle is then used to determine the earliest point of time when the system could be safely split after detection of out of step condition based on the criterion of this invention and tripping command can then be issued.

FIG. 2 shows swing current behaviour during pole slip conditions developed from load condition. Only first portion of characteristic with unsymmetrical currents trajectory is of interest and considered. The phase current is starting from load condition (Point A), gradually approaching the maximum value (Point B) and accelerating to the minimum value (Point C).

FIG. 3 illustrates the swing current magnitude at different angle between two ends, starting from the load current (Point A: source internal voltages are at 40 deg) and then moving towards maximum current (B: sources at 180 deg) and back to the minimum point (C: sources at 0 deg). Then, the radius of swing current is calculated and the circle confirms that the swing current locus is the real circle.

FIG. 4 shows the superimposed quantities plotted alongside swing current for a power swing condition which develops into a pole slip after clearance of a fault on a parallel transmission line.

FIG. 4 is basically a current vs time plot of a system initially swing in a recoverable mode (left half of the figure) and then swinging in non recoverable mode after fault clearance on a parallel line. Superimposed on that plot are Delta I (positive sequence) and Delta R (positive sequence), also vs Time.

FIG. 5 represents measurement and discrimination logic circuit of an apparatus for monitoring stability and detecting out of step condition in the electrical power system.

The logic circuit comprises:
means for measuring the current and voltage of power,
means for calculating the superimposed positive sequence current and superimposed positive sequence resistance,
means for determining the change in polarity of superimposed positive sequence current (ΔI),
means for determining change in polarity of superimposed positive sequence resistance (ΔR),
means for comparing change of polarity of the superimposed positive sequence current (ΔI) with the change in polarity of the positive sequence resistance (ΔR),
means for determining recoverable swing when the change of ΔI polarity continues changing with the change of ΔR polarity,
means for determining pole slip, indicating non-recoverable swing, when the ΔI polarity continues changes its sign but ΔR polarity remains unchanged,
means for calculating the correct instant for tripping ($I_{tripping}$) that corresponds to the desired angle between the two ends of the unstable power system based on pole slip detection,
means for indicating the condition to the relay OOS alarm/tripping logic,
means for initiating a tripping command in order to separate the system when pole slip condition is detected and angle of separation established,
means for initiating trip at a safe system angle upon determination of pole slip condition.

The apparatus mentioned above is a power system protection device, generally referred to as a protection relay.

The current and the voltage inputs are used to calculate the superimposed positive sequence current and superimposed positive sequence resistance.

Positive sequence current, positive sequence voltage and the desired tripping angle are the required inputs into the logic.

As the swing progresses, the positive sign of ΔI coincides with negative sign of ΔR and vice versa. At the peak current ΔI polarity will switch from positive to negative regardless of the nature of the swing at that point the ΔR polarity is checked and if ΔR switches polarity from negative to positive, it is a recoverable swing. If however the ΔR polarity remains negative, it is a non-recoverable swing. The maximum swing current is recorded at the point when ΔI changes polarity and is used as an indication of the maximum phase shift between two equivalent sources. At the point of time when the pole slip condition has been detected the phase shift between two sources equals 180 degrees. This peak magnitude is stored and used to calculate mathematically the exact angle between two sources. This calculated angle is then used to determine the earliest point of time when the system could be safely split after detection of out of step condition based on the criterion of this invention and tripping command can be issued. The power system must be split at favourable angle to allow divided systems to stabilize. Some operating practices require the Out-of-Step tripping when the angle between two sources (θ) is at least 240 deg and closing towards 360 deg. Some other practices, however, request the tripping at 270 deg. In any case, the Out-of-Step tripping must not be allowed when the voltages are out of phase.

In a preferred embodiment of the invention the swing current is determined in the vectorial form by $$I=(Vs-Vr)/ZT$$

where:
Vs—Ph to N voltage at sending end,
Vr—Ph to N voltage at receiving end,
ZT—Total line impedance Zs+Zline+Zr,
where: Zs—source impedance at sending end,
Zline—line impedance,
Zr—source impedance at receiving end.

When the swing current is zero, the Vs and Vr are in phase. When the swing current is maximum, the Vs and Vr are at 180 deg.

By monitoring the swing current changing behaviour during pole slip and having the maximum swing current recorded, it becomes possible to calculate the exact and tripping point at the desired angle θ.

Preferably the magnitude of the current to control the tripping is determined by:

$$I_{tripping}=I_{max}\sin(\theta/2),$$

where:
θ—is the desired system split angle.

The method does not require user settings and ensures reliable discrimination between recoverable power swing and pole slips that indicates non-recoverable power swing and the need for system separation.

The invention claimed is:

1. A method of determining out-of-step tripping angle based on the information about the voltage angle at a remote end contained in a swing current, characterized by the following steps:
   measuring the current and voltage of power system,
   calculating the superimposed positive sequence current and superimposed positive sequence resistance,
   determining the change in polarity of superimposed positive sequence current (ΔI),
   determining change in polarity of superimposed positive sequence resistance (ΔR),
   comparing change of polarity of the superimposed positive sequence current (ΔI) with the change in polarity of the positive sequence resistance (ΔR),
   determining recoverable swing when the change of ΔI polarity has changed with the change of ΔR polarity,
   determining pole slip, indicating non-recoverable swing, when the ΔI polarity has changed whilst ΔR polarity remains unchanged,
   calculating the correct instant for tripping ($I_{tripping}$) that corresponds to the desired angle between the two ends of the unstable power system based on pole slip detection.

2. A method according to claim 1, wherein the magnitude of the swing current to control the tripping at the desired angle θ is determined from the formula: $I_{tripping}=I_{max}\sin(\theta/2)$.
   where:
   θ—the desired system split angle selected between 240° and 270°.

3. An apparatus for determining out-of-step tripping angle based on the information about the voltage angle at a remote end contained in a swing current, characterized in that it comprises:
   means for measuring the current and voltage of power;
   means for calculating the superimposed positive sequence current and superimposed positive sequence resistance;
   means for determining the change in polarity of superimposed positive sequence current (ΔI);
   means for determining change in polarity of superimposed positive sequence resistance (ΔR);
   means for comparing change of polarity of the superimposed positive sequence current (ΔI) with the change in polarity of the positive sequence resistance (ΔR);
   means for determining recoverable swing when the change of ΔI polarity continues changing with the change of ΔR polarity;
   means for determining pole slip, indicating non-recoverable swing, when the ΔI polarity continues changes its sign but ΔR polarity remains unchanged;
   means for calculating the correct instant for tripping ($I_{tripping}$) that corresponds to the desired angle between the two ends of the unstable power system based on pole slip detection;
   means for indicating the condition to the relay OOS alarm/tripping logic;
   means for initiating a tripping command in order to separate the system when pole slip condition is detected and angle of separation established;
   means for initiating trip at a safe system angle upon determination of pole slip condition.

* * * * *

UNITED STATES PATENT AND TRADEMARK OFFICE
CERTIFICATE OF CORRECTION

PATENT NO. : 8,369,055 B2  Page 1 of 1
APPLICATION NO. : 12/746915
DATED : February 5, 2013
INVENTOR(S) : Cvorovic et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 423 days.

Signed and Sealed this

First Day of September, 2015

Michelle K. Lee
*Director of the United States Patent and Trademark Office*